W. F. TOOTHAKER.
Chucks.

No. 158,007.    Patented Dec. 22, 1874.

Witnesses
John L. Boone
C. M. Richardson

Inventor
William F. Toothaker
by Dewey & Co
Atty's

United States Patent Office.

WILLIAM F. TOOTHAKER, OF SAN FRANCISCO, CALIFORNIA.

IMPROVEMENT IN CHUCKS.

Specification forming part of Letters Patent No. 158,007, dated December 22, 1874; application filed October 21, 1874.

*To all whom it may concern:*

Be it known that I, WILLIAM F. TOOTHAKER, of San Francisco city and county, State of California, have invented a Bevel-Chuck; and I do hereby declare the following description and accompanying drawings are sufficient to enable any person skilled in the art or science to which it most nearly appertains to make and use my said invention, without further invention or experiment.

My invention relates to certain improvements in chucks for lathes, boring, or other machines in which chucks may be used to hold the work; and it consists in the employment of a beveled and plain face moving upon each other, so that the work to be done shall be held in an inclined position to the axis of motion, and it can be reversed by turning one of the faces half around, so that two bevel faces can be turned which shall be exactly alike.

Figure 1:
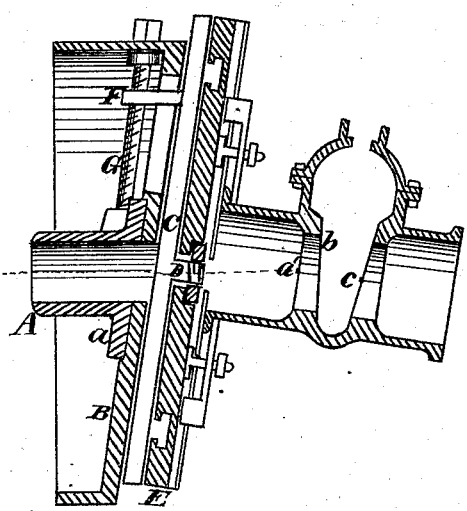
Figure 2:
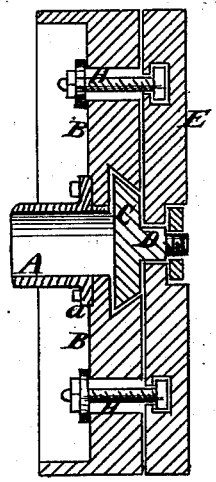
Figure 3:
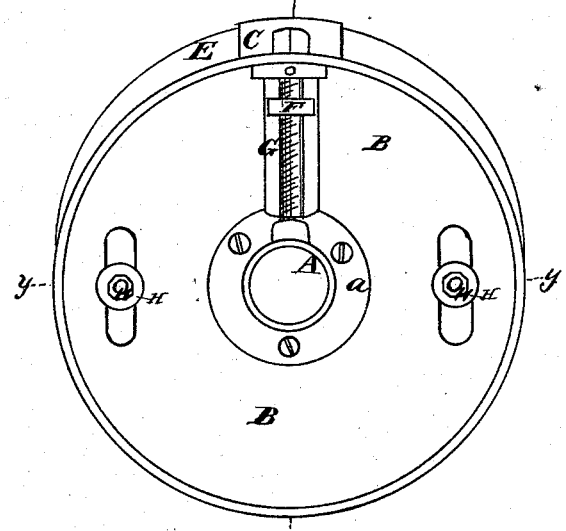
Figure 4:
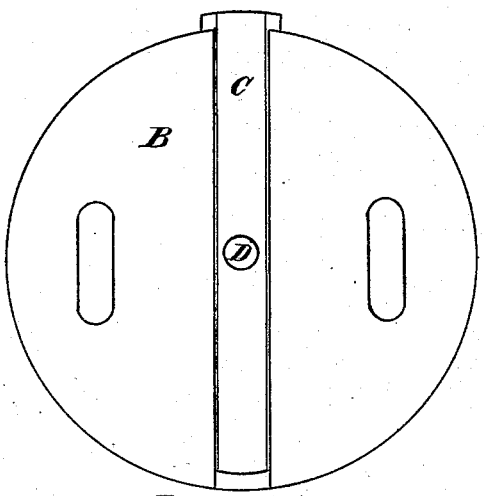

Referring to the accompanying drawings for a more complete explanation of my invention, Figure 1 is a section of my chuck taken through $x\ x$ of Fig. 3. Fig. 2 is a section of my chuck taken through $y\ y$, Fig. 3. Fig. 3 is a back view of the chuck. Fig. 4 is a front view, showing the bevel side.

A is a hub, which is fitted upon a lathe-spindle, the shaft of a boring-mill, or a drill-press, and B is that part of the chuck which is secured to this hub. The front and rear faces of the part B are so turned that they are inclined, and stand at an angle (not a right angle) with the lathe-spindle. The hub A is made to be secured by bolts, or otherwise, to the rear face of B, and consequently its flange $a$ must also stand angularly with its bore and the spindle, while the hub is parallel with it. It will be seen that various angles relative to the lathe-spindle may be obtained by the use of different hubs, and the face-plate can be made to run truly by employing a hub with a true securing-flange; and this allows the lathe to be used for ordinary purposes. Transversely across the face of the part B a dovetailed slot is cut, within which the slide C moves at right angles to the axis. A short spindle, D, upon this slide serves to support the second independent face-plate E, and allow it to be turned around to any desired point. The slide C is provided with a lug, F, which projects through a slot in the plate B, and this lug serves as a nut, through which the screw G passes, and by which the slide is moved to one side or the other, so that the spindle D will be out of a line with the axis or spindle of the lathe, for a purpose to be hereafter described.

The face of the plate B is oblique, as before described, so as to be inclined to an angle (not a right angle) with the lathe-spindle; and as this chuck is to be used for special purposes, the angle will have to be determined by the work to be done, and can be effected by the hub A, as before described. Upon this oblique face I fit the plate E, which is turned perfectly true in a lathe, and has a circular holding-groove upon one side, into which the heads of the bolts H are slipped. The bolts pass through slots in the plate B, and are secured by nuts and washers at the back of the plate, so that the plate E can be turned about the spindle D, and will be held at any point by tightening these nuts. The front of the plate E has the usual cross-grooves for the insertion of holding clamps or bolts, as is usual in other face-plates.

My beveled chuck is intended to be used for facing the flanges of water-gates where a beveled slide is made to move across a water pipe or passage.

In order, therefore, to better explain the operation, I have shown my chuck with a section of a water-gate secured to it.

The operation will be as follows: The gate or article having a beveled face to be turned or faced up is secured to the face of the plate E in the ordinary manner, so that the part to be faced shall stand at right angles with the lathe-spindle, and it will be, therefore, run truly.

By means of the beveled slide C and the screw G the article is moved over until the center, as at $a$, is in a line with the lathe-spindle, and the lathe being then set in motion, a tool can be used to turn up the face $b$. This being finished, the holding-screws of the plate E are loosened, and the plate is turned half around, and again secured by the holding-nuts.

By means of the slide C the article is moved over, so that the center $c$ of the opposite bevel will be in a line with the spindle of the lathe, and this face is then turned up. It will be manifest that a wedge-shaped valve can then be easily fitted to this opening so as to be tight.

My chuck will be applicable to any class of beveled work.

Having thus described my invention, what I claim, and desire to secure by Letters Patent, is—

1. The transverse slide C, with its adjusting-screw G, in combination with the obliqued face-plate B, and face-plate E, mounted on the spindle D, and constructed as and for the purpose set forth.

2. The combination of the obliquely-faced hub A with the obliquely-faced plate B, substantially as and for the purpose set forth.

3. The oblique-faced head B, in combination with a transversely-adjustable slide and a pivoted face-plate, as and for the purpose described.

In witness whereof I hereunto set my hand and seal.

WILLIAM FRANKLIN TOOTHAKER. [L. S.]

Witnesses:
   JNO. L. BOONE,
   C. M. RICHARDSON.